June 16, 1959   G. P. DUVALL, JR., ET AL   2,890,589
PRECISION POSITIONING DEVICE
Filed April 19, 1956

INVENTORS.
ROSARIO C. GRANATA
& GEORGE P. DUVALL JR.
BY
Wade Koontz
Arnold H. Cole
ATTORNEYS United States Patent Office 2,890,589
Patented June 16, 1959

2,890,589
PRECISION POSITIONING DEVICE

George P. Duvall, Jr., Tucson, Ariz., and Rosario C. Granata, Somerville, Mass., assignors to the United States of America as represented by the Secretary of the Air Force Application April 19, 1956, Serial No. 579,417

5 Claims. (Cl. 74—1)

(Granted under title 35, U.S. Code (1952), sec. 266)

The invention described herein may be manufactured and used by or for the United States Government for governmental purposes without payment to us of any royalty thereon.

This invention relates to a positioning mechanism, and more particularly to such a mechanism which is capable of moving a member to a desired location with a heretofore unknown degree of speed and accuracy.

There are many instances in which a proper initial alignment of the equipment being used is vital to achievement of the desired final result. One such case is the locating of an object in the crosshairs of a gunsight or a camera rangefinder. Other cases might involve the positioning of a film in a viewer with respect to a graphic pattern imposed on the screen, or the setting of a machine tool in a pressing or drilling process.

The manual positioning devices presently in use can produce the requisite precision only at the expense of excessive operator time and effort. The present invention contemplates an electrically operated unit which will overcome the above deficiency. The embodiment hereinafter specifically described is adapted to be installed in existing equipment with an absolute minimum of reconstruction.

It is an object of this invention to provide a precision positioning unit which is electrically actuated to increase accuracy and eliminate wasted time and effort.

It is a further object of this invention to provide such a unit which is both simple and economical to produce.

Another object of the invention is to provide a unit which may be substituted for existing units without requiring substantial modification of the associated machine.

Other objects and advantages of the invention will become apparent from the following detailed description of one embodiment thereof, taken in conjunction with the accompanying drawings, in which.

Figure 1:
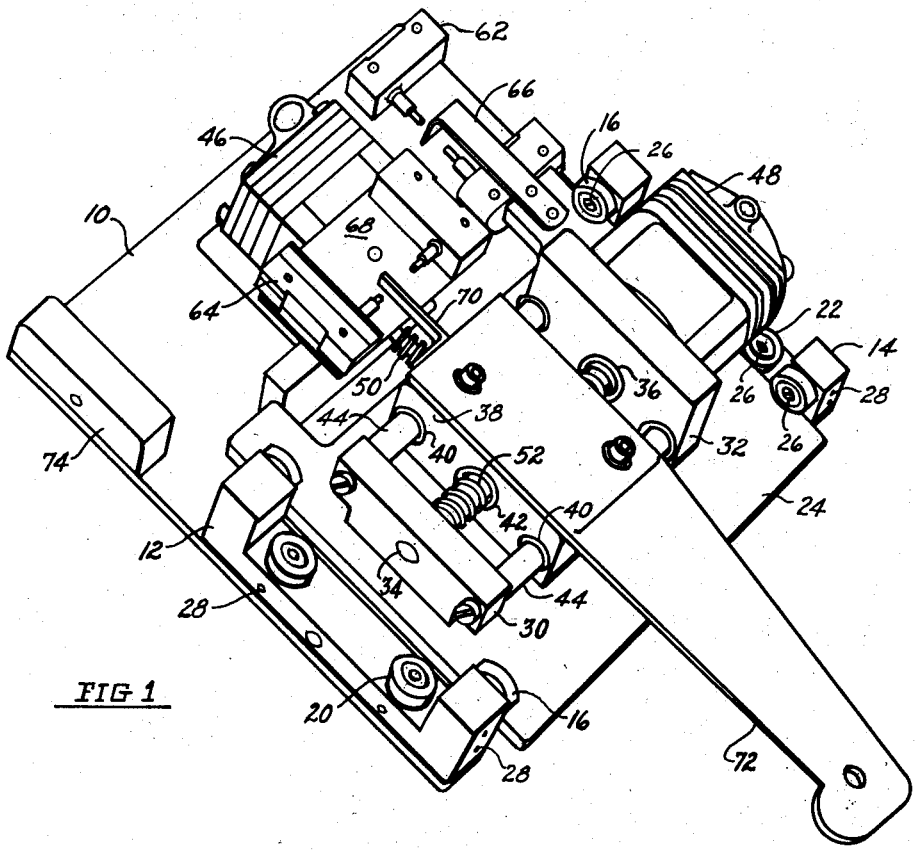
Fig. 1 is a pictorial plan view of a positioning unit constructed in accordance with our invention.
Figure 2:
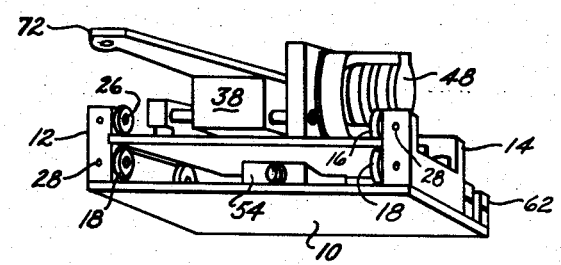
Fig. 2 is a pictorial end view of the unit shown in Fig. 1.

Referring now to the drawings wherein like characters of reference indicate like parts, the positioning unit is mounted on a base plate 10. The base plate is preferably rectangular in shape, and it carries a pair of roller supports 12 and 14. These supports are fixed at opposite sides of base plate 10 adjacent one end thereof. Each support is in the form of a U having a pair of upstanding legs and a base which rests on plate 10. The upper and inner face of each of said legs has a sealed ball bearing roller 16 mounted thereon. Similar rollers 18, spaced below rollers 16, are also mounted on the inner face of each leg as shown in Fig. 2. The upper face of the base of each support has an additional pair of rollers mounted thereon. The axes of these latter rollers are transverse to the axes of rollers 16 and 18. Figs. 1 and 2 show these rollers at 20 and 22 mounted on bases of supports 12 and 14, respectively.

A carriage 24 rides the rollers in a plane parallel to the plane of base plate 10. The lateral edges of said carriage co-operate with rollers 20 and 22 while the upper and lower faces of said carriage co-operate with rollers 16 and 18, respectively. This arrangement permits a smooth, guided motion of the carriage along its path. Since increased precision is a primary objective of this invention, means are also provided to prevent undesirable vibratory motions of carriage 24 in the lateral and vertical directions. Such means take the form of eccentric pins which are used to mount the rollers 16 and 22. These pins are shown at 26 in Fig. 1, and they are formed with slotted heads to accommodate an adjusting tool. The rollers 18 and 20 may be mounted on any conventional type of pins. An aperture 28 is bored transversely of each of the pins. These apertures receive set screws for locking such pins in any adjusted position. Thus, if the carriage is found to be loosely mounted in the vertical direction the eccentric pins in the rollers 16 may be adjusted until a proper rolling fit has been obtained. In a like manner, the eccentric pins in rollers 22 may be adjusted to eliminate any undesirable lateral motion.

Fixed on the upper face of the carriage 24 are a pair of spaced guide blocks 30 and 32. These are arranged in parallel relationship with the supports 12 and 14. Guide block 30 has a pair of bores, one adjacent each end thereof. A second pair of bores, aligned with the bores in block 30, are formed in guide block 32. A third bore 34 is formed in block 30 between the end bores, and block 32 has a third bore 36 between its end bores. A follower 38 is positioned intermediate guide blocks 30 and 32. Said follower has a bore 40 adjacent each end and a threaded aperture 42 coaxial with bores 34 and 36 in the guide blocks. A pair of accurately machined slide rods 44 are fixed in the end bores of the guide blocks. The slide rods pass through bores 40 in the follower. The latter is thus suspended above carriage 24, and may reciprocate with respect thereto along said rods.

The carriage 24 and the follower 38 are driven by a pair of identical, A.C., synchronous gear head, reversible motors 46 and 48, respectively. The motors should have a relatively low output, preferably in the neighborhood of 2 r.p.m. Motors 46 and 48 are provided with threaded drive screws 50 and 52.

The base plate 10 mounts motor 46. Drive screw 50 passes through and co-operates with a threaded aperture in a block 54, fixed to the underside of the carriage 24, as shown in Fig. 2. The block 54 is a size such that its lower face is clear of the upper face of base plate 10. The motor 48 is mounted on carriage 24, and its drive screw 52 rides in bores 34 and 36 in the guide blocks 30 and 32. Screw 52 also passes through and co-operates with the threaded aperture 42 in follower 38.

Figure 3:
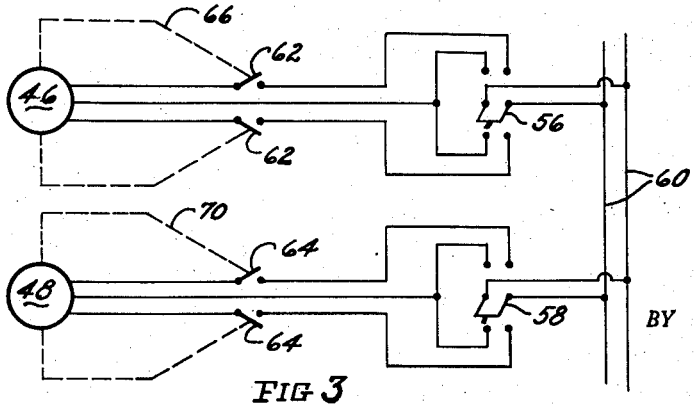
Fig. 3 is a schematic diagram of the electrical connections of the positioning unit.

Energization of the motors 46 and 48 is controlled by a pair of manually-controlled, double throw, center off, toggle switches 56 and 58. These switches are shown schematically in Fig. 3. They can be mounted at any point convenient to the operator. A power line 60 supplies alternating current to the motor circuits. One set of automatically-controlled limit switches 62 are placed in the circuits for motor 46, and a similar set of switches 64 are placed in the circuits for motor 48. The switches may be arranged so that the associated motor will be automatically disconnected from the power line 60 at any chosen point.

Referring again to Fig. 1, the limit switches 62 are mounted on the base plate 10. The switches are actuated by an arm 66 which is carried by carriage 24. A plate 68 is mounted on the housing of motor 46, and limit switches 64 are fixed to said plate. An arm 70 is bolted to the follower 38 and co-operates with switches 64 to actuate the latter. For convenience of illustration, arms 66 and 70 are each shown by a pair of broken lines in Fig. 3.

In order to transmit motion of the positioning device to the member to be moved, a link 72 is fixed to the follower 38. The device may be installed in existing equipment by means of brackets 74, one of which is shown in Fig. 1.

The dimensions of the various parts may be chosen in accordance with the space available for accommodating the positioning device. The several plates, blocks and supports are preferably made of aluminum which combines lightness of weight with desirable strength. It has been found that when substituted for conventional manual positioning devices, the invention heretofore described reduces positioning time as much as 35% while increasing the degree of accuracy obtainable.

In operation base plate 10 is fixed in place, and the link 72 is connected to the member to be moved. If switch 56 is then closed, the motor 46 will rotate its drive screw 50 and cause the carriage 24 to move in one direction along the axis of said screw. Since follower 38 is mounted on the carriage by means of the guide blocks, the motion of the carriage is transmitted through the follower and the link 72 to the end member. Switch 56 is then opened and switch 58 is closed to drive motor 48 and its drive screw 52. This will cause follower 38 to move along the axis of said latter screw. Thus it can be seen that proper manipulation of switches 56 and 58 will cause reciprocating movement of the link and the member connected thereto along the axis of either screw. While such axes have been shown here as perpendicular, it is apparent that any desired orientation of motor 48, screw 52 and, consequently, follower 38 can be chosen.

It is to be understood that the above-described arrangement is merely illustrative of the applications of the principles of the invention. Numerous other arrangements may be devised by those skilled in the art without departing from the spirit and scope of the invention.

What is claimed is:

1. A device of the class described comprising a base, a carriage, means mounting said carriage for reciprocation relative to said base, said mounting means comprising only a plurality of friction reducing roller means, guide means mounted on said carriage but separable therefrom, said guide means being angularly adjusted in a plane parallel to that of said carriage, a follower mounted on said guide means for reciprocation relative to said carriage and said base, there being an angle formed between the axes of reciprocation of said carriage and said follower, and motor means for driving said carriage and said follower.

2. A device as defined in claim 1 wherein said roller means includes pairs of roller bearings, one of each of said pairs of bearings being positioned to contact one face of said carriage, the other of each of said pairs being positioned to contact the other face of said carriage, there being at least one pair of bearings on each side of the axis of reciprocation of said carriage, and at least one of each of said pairs of bearings being adjustably mounted.

3. A device as defined in claim 1 wherein said roller means includes at least one roller bearing in contact with the lateral edge on each side of the axis of reciprocation of said carriage, and adjustable mounting means for said bearings.

4. A device of the class described comprising a base, a carriage, said carriage being mounted solely by a plurality of roller bearings for reciprocation relative to said base, said bearings including at least one in contact with the lateral edge of the carriage on each side of its axis of reciprocation, said bearings also including at least two pairs of bearings, one of each of said pairs being positioned in contact with one face of said carriage and the other of each of said pairs being positioned in contact with the opposite face of said carriage, the faces of said carriage on each side of said axis of reciprocation having at least one of said pairs of bearings in contact therewith, and angularly adjustable guide mounted on said carriage and separable therefrom, a follower mounted on said guide for reciprocation relative to said carriage and said base, there being an angle formed between the axis of reciprocation of said carriage and said follower, and motor means for driving said carriage and said follower.

5. A device as defined in claim 4 wherein said bearings in contact with the lateral edges of said carriage are adjustably mounted on eccentric pins, and at least one of each of said pairs of bearings are also adjustably mounted on eccentric pins.

References Cited in the file of this patent

UNITED STATES PATENTS

| | | |
|---|---|---|
| 2,242,336 | Atwood | May 20, 1941 |
| 2,446,393 | Russell | Aug. 3, 1948 |
| 2,581,602 | Pulsifer | Jan. 8, 1952 |
| 2,622,939 | Ljunggren | Dec. 23, 1952 |
| 2,628,539 | De Beer Gaard | Feb. 17, 1953 |
| 2,674,706 | Knosp et al. | Apr. 6, 1954 |
| 2,696,565 | Shockley | Dec. 7, 1954 |